(12) United States Patent
Cifteli et al.

(10) Patent No.: US 10,042,338 B2
(45) Date of Patent: Aug. 7, 2018

(54) METHOD AND SYSTEM FOR CONTROLLING DEVICES WITH A CHAT INTERFACE

(71) Applicant: FUJITSU LIMITED, Kawasaki-shi, Kanawaga (JP)

(72) Inventors: George Cifteli, Köln (DE); Thomas Deckers, Köln (DE)

(73) Assignee: FUJITSU LIMITED, Kawasaki (JP)

( * ) Notice: Subject to any disclaimer, the term of this patent is extended or adjusted under 35 U.S.C. 154(b) by 292 days.

(21) Appl. No.: 14/859,144

(22) Filed: Sep. 18, 2015

(65) Prior Publication Data

US 2016/0085398 A1 Mar. 24, 2016

Related U.S. Application Data

(60) Provisional application No. 62/052,717, filed on Sep. 19, 2014.

(51) Int. Cl.
| | | |
|---|---|---|
| *G06F 3/00* | (2006.01) | |
| *G05B 15/02* | (2006.01) | |
| *H04L 12/58* | (2006.01) | |
| *G06F 3/0488* | (2013.01) | |
| *G06F 3/0484* | (2013.01) | |

(52) U.S. Cl.
CPC ........... *G05B 15/02* (2013.01); *G06F 3/0488* (2013.01); *G06F 3/04847* (2013.01); *H04L 51/04* (2013.01)

(58) Field of Classification Search
CPC .................................................. G06F 3/04847
USPC ......................................................... 715/740
See application file for complete search history.

(56) References Cited

U.S. PATENT DOCUMENTS

| | | | | |
|---|---|---|---|---|
| 8,499,248 | B1 * | 7/2013 | Keel ................... | G06F 17/3087 715/753 |
| 8,726,198 | B2 * | 5/2014 | Rydenhag ............... | G06F 3/017 345/173 |
| 9,684,378 | B2 * | 6/2017 | Lazaridis ................ | G06F 3/017 |
| 9,684,429 | B2 * | 6/2017 | Chaudhri ............ | G06F 3/04817 |
| 2009/0249247 | A1 * | 10/2009 | Tseng ................ | H04M 1/72552 715/808 |
| 2009/0259937 | A1 * | 10/2009 | Rohall ................... | G06Q 10/10 715/706 |
| 2013/0024799 | A1 * | 1/2013 | Fadell ................ | G05D 23/1902 715/771 |
| 2013/0332856 | A1 * | 12/2013 | Sanders ................ | G06F 3/0481 715/753 |
| 2017/0147711 | A1 * | 5/2017 | Langseth .......... | G06F 17/30979 |

* cited by examiner

*Primary Examiner* — William Titcomb
(74) *Attorney, Agent, or Firm* — Maschoff Brennan (57) ABSTRACT

Disclosed is a method and system to control devices using a chat interface. The approach is particularly applicable to home automation devices, though is not limited in its application to such devices.

27 Claims, 11 Drawing Sheets

METHOD AND SYSTEM FOR CONTROLLING DEVICES WITH A CHAT INTERFACE

CROSS-REFERENCE TO RELATED APPLICATION(S)

This application claims the benefit of U.S. Provisional Application No. 62/052,717 filed on Sep. 19, 2014, which is hereby incorporated by reference in its entirety.

BACKGROUND

Many types of interfaces are used to control devices and components. Physical controls can be used to manually control the operation of many kinds of devices. In many cases, software interfaces can also be provided to control the operation of a device. Some devices may accept control inputs using both physical and software based control interfaces.

For example, consider the common thermostat that is used to control the operation of HVAC equipment within a home or office. Many thermostats can be controlled by a user using mechanical knobs and switches that exist on the thermostat unit itself. Some thermostats include a software interface, using a touchscreen, that allows the user to program and operate the thermostat via the software interface. There are even web-enabled thermostats, where a browser-based interface can be used to control the operation of the thermostat.

The problem with these conventional approaches is that they all require a dedicated interface to be particularly designed and implemented for the device. For the manufacturer of the product, this results in a relatively costly process to design the interface, which may be difficult to change at a later date, reduces design flexibility, and which may be excessively complex to build. For the user of the product, the conventional interfaces are often too complex to learn how to use (involving many pages of instructions) and may be too specific to the product.

Therefore, there is a need for an improved approach to implement access and control to devices and components that address these problems of the conventional approaches.

SUMMARY

Embodiments of the present invention provide a method and system to control devices using a chat interface. The embodiments of the invention are particularly applicable to home automation devices, though is not limited in its application to such devices.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

The drawings illustrate the design and utility of embodiments of the present invention, in which similar elements are referred to by common reference numerals. In order to better appreciate the advantages and objects of embodiments of the invention, reference should be made to the accompanying drawings. However, the drawings depict only certain embodiments of the invention, and should not be taken as limiting the scope of the invention.

DETAILED DESCRIPTION OF THE EMBODIMENTS OF THE INVENTION

The present disclosure pertains to an improved approach to implement an interface to control devices and components. The general idea is that a "smart" chat bubble or "smart bubble" is provided which allows a chat interface to be used to control a remote device. While the below description provides illustrative examples involving specific devices and components (such as home automation devices in the form of a thermostat), it is noted that the invention is not limited in its application only to those example devices/components, and indeed is broadly applicable to any suitable device or component.

As just one example scenario, consider a home automation device that is used in a private home to control the temperature of the home, by managing the operation of the heating or cooling system in that home. In the present invention, the home automation device can be controlled with a software interface that is accessible using a chat program.

A software agent is associated with the home automation device, which is an entity capable of receiving chat messages from the user. To the user's chat program, the chat agent appears as any other entity to which a chat message can be sent to or received from. However, when the user sends a chat message to the chat agent, that message is actually sent to the chat agent for the home automation device, and is converted to a format that is understandable by the home automation device.

The chat interface to the chat agent can be configured to include a graphical interface for manipulating and controlling the operation of the home automation device. For example, a graphical slider interface can be provided in the chat bubble to allow the user to adjust the preferred temperature to be set by a thermostat in the home. When the graphical interface is manipulated in the chat bubble, a chat message is sent to the chat agent, in a format comprising an API call that is understandable by the software interface component for the home automation device. The thermostat then makes its internal adjustments as specific by the user's intended control instructions.

There are multiple ways to implement the smart bubble control interface in a chat bubble. One possible approach is to embed the interface (e.g., an HTML form or JavaScript) directly into a chat message. The interface embedded in the chat bubble can also include executable code (e.g., using JavaScript). Another possible approach is to create a contact for the chat agent, and to then embed the HTML form/form library in the chat contact. In an alternate embodiment, the interface can be presented from executable code embedded in the chat client that is triggered by specific control messages received by the chat client.

Figure 1:
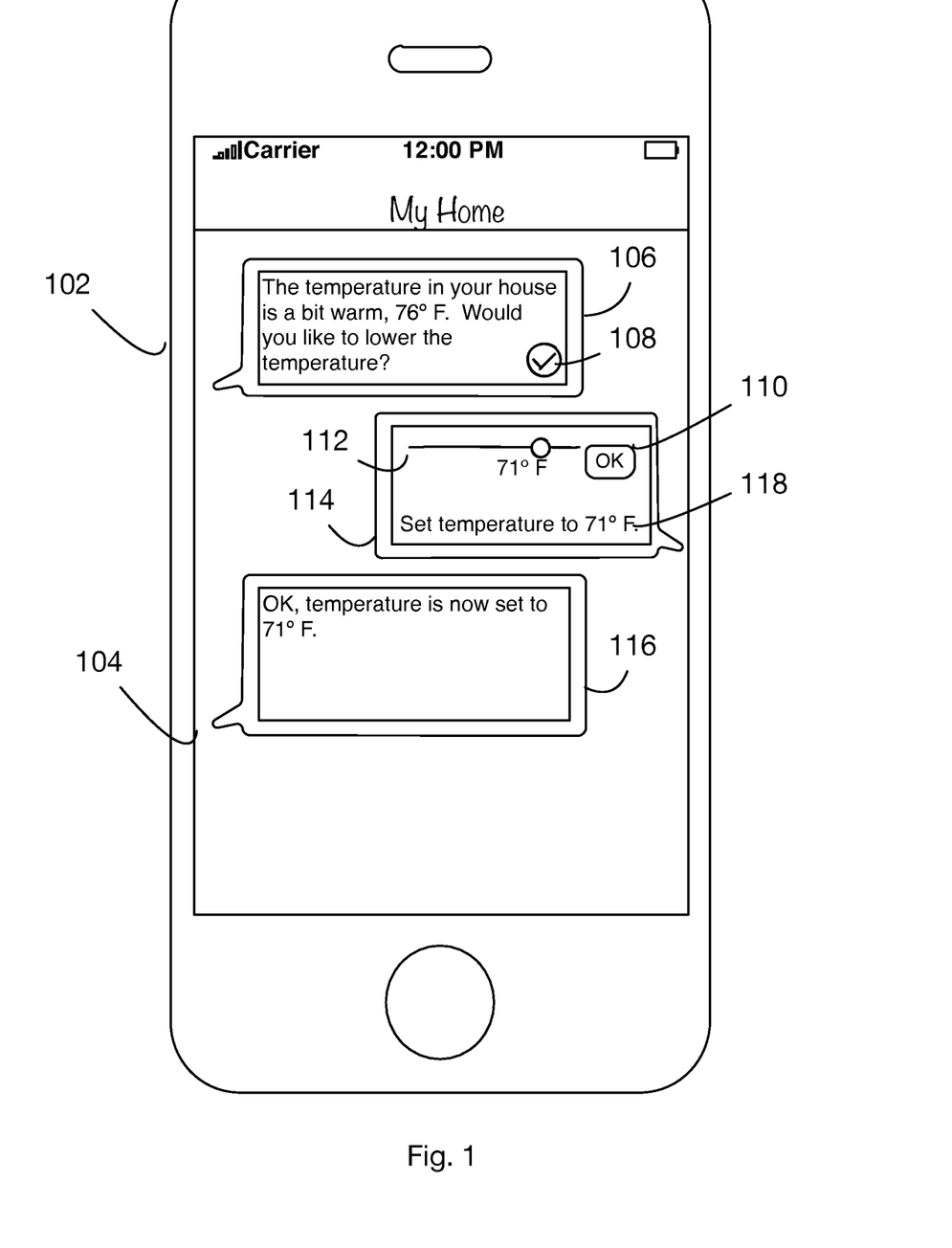
FIG. 1 shows an example user interface for implementing the invention in some embodiments.

FIG. 1 shows an example user interface for a smart bubble displayed on a digital device. In FIG. 1, a series of chat bubbles are shown displayed on a digital device 102. In this chat interface context 104, the user's responses or input 114 are shown in chat bubbles on the right side of the display, and the chat agent's responses are shown on the left side of the display 106, 116.

This figure illustrates the scenario of home temperature control by utilization of a smart bubble in a chat context. In this scenario, a chat agent has sent a message to the user stating that the user's house is getting warm, and asking if the user would like to lower the temperature 106, e.g., based upon a sensor in the home and/or thermostat that records a temperature value, and for which the recorded temperature value triggers the chat agent to send the chat message 106. The user has accepted the temperature change request with control 108, and is presented with a smart bubble 114 with a thermostat control slider bar 112.

The user has moved the temperature slider bar 112 from the previous position at 76° F. to select 71° F. and has accepted the change with the OK button 110. The smart bubble responds with an affirmation that the temperature is going to be set to 71° F. 118. The temperature change action is sent in a message to the chat agent and the thermostat and the chat agent responds in message 116 that the temperature in the house is now set to 71° F.

Figure 2:
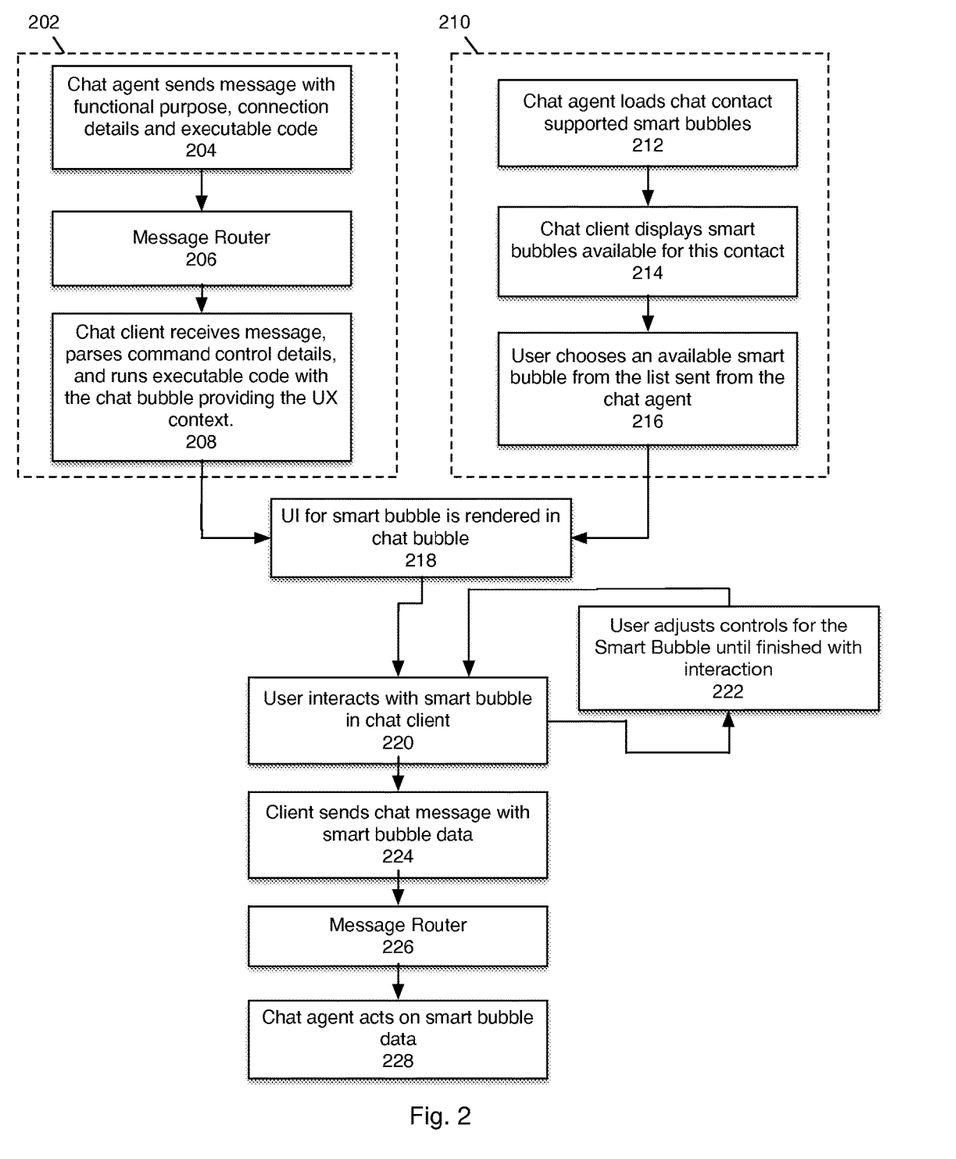
FIG. 2 shows a flowchart of an approach for implementing the invention according to some embodiments.

FIG. 2 shows a flowchart of an approach for implementing the invention according to some embodiments. The top left dashed box 202 describes the approach for embedding the HTML form or smart bubble into the chat message and the top right dashed box 210 describes the approach for embedding the HTML form/library or smart bubble library into a chat contact.

Starting with the left side of the flowchart at 202, the process begins by having the chat agent send a message with an embedded smart bubble (e.g., a HTML form or JavaScript to the user at 204. For example, a home automation device (e.g., that includes a thermostat, is linked to a thermostat, and/or is embodied as a thermostat) may be programmed to detect certain triggering events that cause a chat message to be sent to a home's owner, e.g., when the temperature gets above for below a designated temperature. In this situation, the chat agent for the home automation device may send a chat message to the user having an embedded smart bubble for controlling the temperature.

Next, that message is sent to a message router at 206, which then conveys that chat message to the user's chat client. When the user's chat client receives the message at 208, the message is rendered in a chat bubble to include the smart bubble at 218. Any messaging chat client can be used, and on any suitable platform. For example, it is contemplated that the invention can be used in conjunction with a chat client on a user's mobile phone, tablet device, PC, or any other platform that is usable with a chat client.

At this point, when the user opens the chat interface, the chat message having the smart bubble is displayed to the user at 218. In many cases, the smart bubble will include a graphical interface that is controllable by the user to adjust a setting for the remote device associated with the chat agent at 220. At 222, the user can then manipulate the graphical interface as desired. The user then submits the smart bubble in the chat bubble.

At 224, the chat client sends the chat message with the smart bubble data, which is received by a message router of a messaging platform at 226. The chat message having the smart bubble data is then delivered to the chat agent. The chat agent can then act upon the form data to control the device 228.

As noted above, the top right path at 210 describes an approach for embedding the smart bubble library into a chat contact. This path 210 begins by loading an agent contact with an embedded smart bubble library at 212. At 214, the chat client will then display the smart bubble as a set of options that can be selected. The user may choose one of the smart bubbles from the library as an option at 216, and proceed to manipulate the interface within the form as described above. The rest of the processing then proceeds as previously discussed.

This invention therefore provides numerous advantages over the conventional approaches. One particular advantage is that a chat interface has become relatively universal, and hence is easily used and adopted by many people without requiring any additional or specialized training. Therefore, this approach permits great ease of use and quick adoption by users. From the developer's perspective, this approach permits easy implementation, since it rides above existing chat interfaces, and only new smart bubbles need to be created that control the device.

It is noted that that the interface in the chat bubble can be configured to be manipulated by the user any number of times. In one embodiment, the interface provides one-time usage to the user. In alternate embodiment, the interface in the chat bubble can be re-used multiple times by the user. Therefore, the process flow described in FIG. 2 can also be implemented to include a control loop for manipulating the smart bubble multiple times.

Figure 3A:
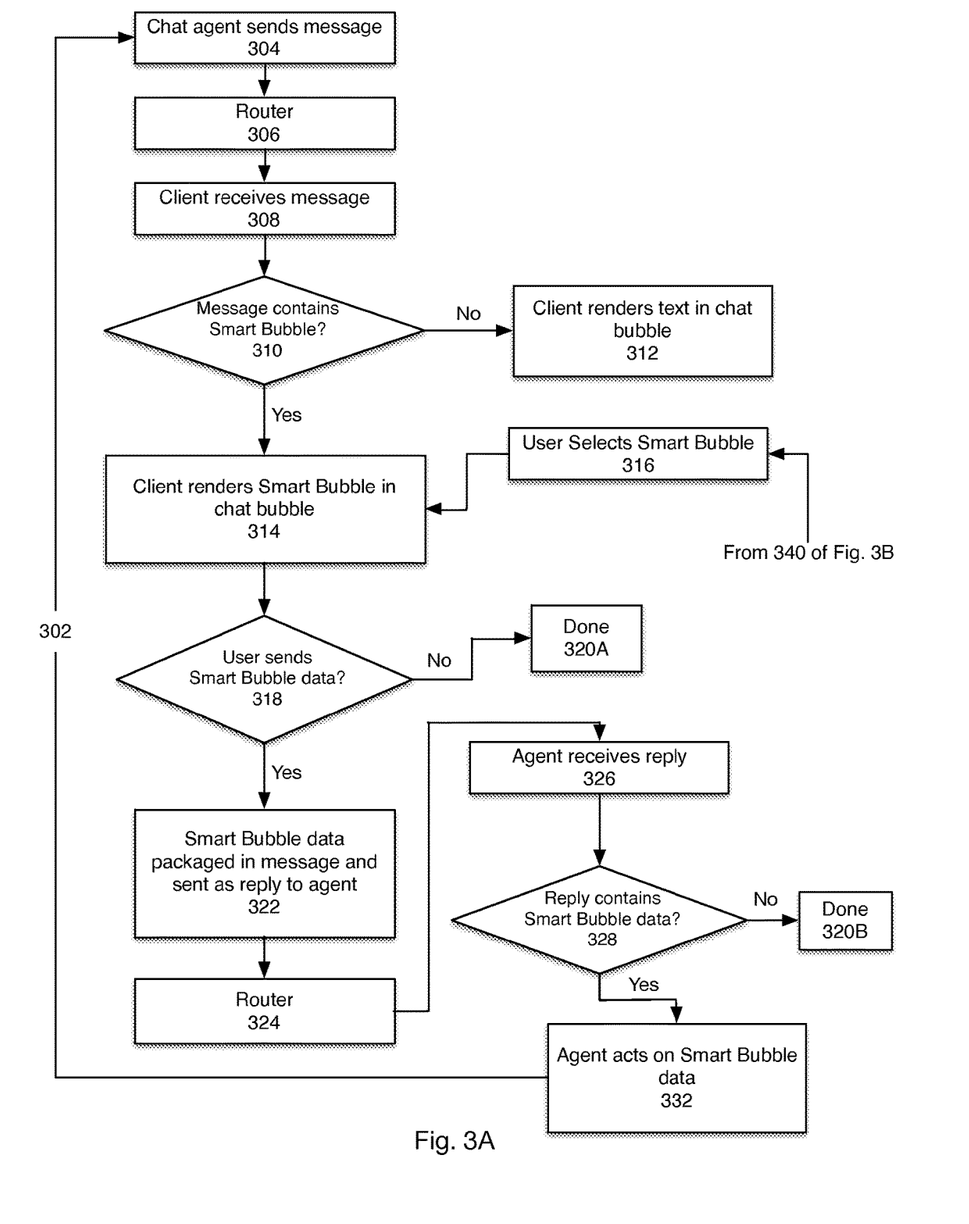
FIGS. 3A-B provide more detailed flowcharts of an embodiment of the invention.
Figure 3B:
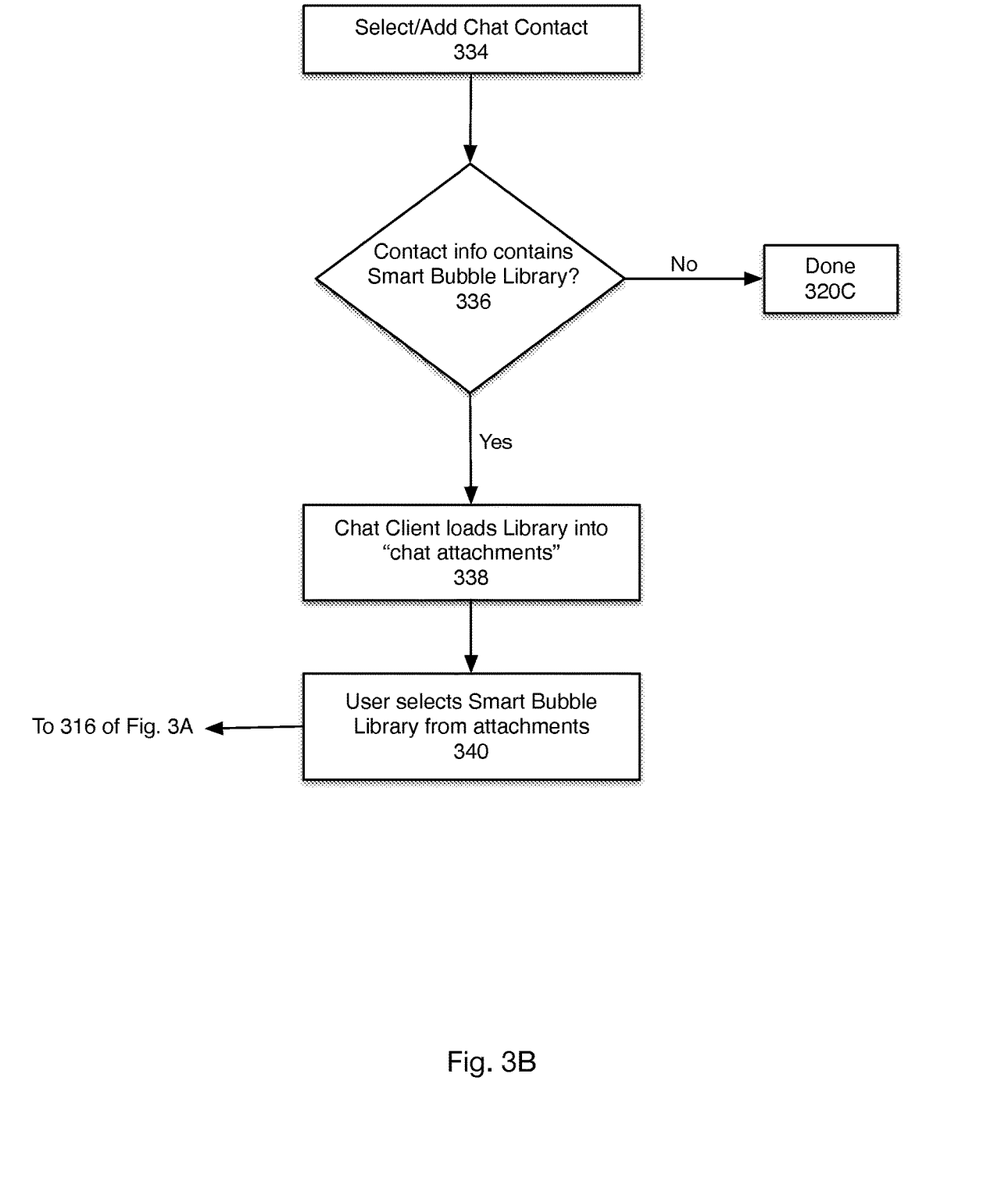

FIGS. 3A-3B provides a more detailed flowchart of an embodiment of the invention. FIG. 3A describes the approach for embedding the smart bubble into the chat message and FIG. 3B describes the approach for embedding the smart bubble library into a chat contact.

At 304, the process begins by having the chat agent send a message with an embedded smart bubble to the user. The chat agent is a software program or embedded device which can send messages addressed to the user's client device or devices. These messages sent by the chat agent can include information such as source address, destination address, timestamps, device metadata, user metadata, state information, and other relevant information in addition to the smart bubble or forms describing one or more smart bubbles.

The generated message from the chat agent is sent to a message router at 306 which handles delivery of the message to the user's client device. The message router can be implemented in a client-server architecture. A standard application protocol such as the Extensible Messaging and Presence Protocol (XMPP) can be used as the communications protocol. Messages sent to and from the message router can be delivered using Websockets for a transport layer protocol. Further details of a message routing platform are described in FIG. 8.

The message router then conveys that chat message to the user's chat client at 308. In some embodiments, a chat message can arrive to the chat client over an open TLS/SSL socket connection. In alternate embodiments, the chat message can be retrieved from a server using polling or duplex binding methods.

When the user's chat client receives the message at 308, a determination is made whether the message contains a smart bubble at 310. If a smart bubble is not contained in the message, then the client proceeds to render the text into the chat bubble at 312. The rendered text is displayed to the user on a digital device in the chat message context.

However, if the message contains a smart bubble, then the message is rendered in a chat bubble to include the smart bubble at 314. At this point, the chat message having the smart bubble is displayed to the user. The chat bubble will include an interface, e.g., a graphical interface that is controllable by the user to adjust a setting for the remote device associated with the chat agent. The user can then manipulate the graphical interface as desired.

When the user reviews the message in the chat bubble, the user has the choice of whether to engage with the interface to provide instructions to control the relevant device at 318. If the user chooses not to make any manipulations to the control interface, then the form will not be submitted. The process at 320A then completes and no further smart bubble rendering or communication is necessary.

However, if the user chooses to control the device by manipulating an interface in the chat bubble, then that manipulated form is submitted. An application running on the client's device recognizes the form submission from the interface and perform the necessary actions to process the message response to the chat agent.

If the form was submitted, then the form data is packaged in a message and is sent as a reply to the chat agent for the device at 322. At 324, the chat client sends the chat message through a message routing platform to the chat agent.

At 326, the chat agent receives the message, and at 328 will then check whether the reply contains form data (e.g., data pertaining to whether the user has manipulated the interface). If no smart bubble data is contained in the reply message from the chat client, them the process ends at 320B.

However, if the reply does contain form data, then the agent acts upon the message data to control the device as instructed by the user at 332. In some embodiments, the chat agent processes the form data contained in the message and communicates with an internal or external device service for device control. In an alternate embodiment, a chat agent existing on a hard are device can directly control a hardware or software device using instructions processed from the message received. Further details of the chat agent, and chat agent device control are described in FIG. 7.

Once the chat agent has acted upon the smart bubble message data at 332, at 302, an optional response can be sent to the user with feedback on the results of the action performed. The process flow then repeats with the chat agent sending a message to the user's client device at 304. If no feedback is required, the process ends with the chat agent action at 332.

FIG. 3B describes an approach for embedding the smart bubble library into a chat contact. In this embodiment, a known or discovered device can be controlled by the user through utilization of smart bubbles. A device can appear to the user as a chat contact with several potential smart bubble interactions.

These interactions are described by the set of smart bubble libraries associated with the device. In some embodiments, these form libraries can be discovered from a central service by utilization of an authentication method and a device plus user ID pair. In an alternate embodiment, potential interactions through smart bubbles can be discovered directly from the device itself by a direct communications link with the chat client device.

For example, a user may wish to control a home light fixture which has smart bubble capability. When the light fixture is discovered and authenticated by the user (e.g., using a method such as Bluetooth pairing), the user is presented with the ability to add the light fixture as a chat contact. Once the light fixture is added as a contact, potential interactions presented by the light fixture can be displayed and utilized. These potential interactions are contained in a smart bubble library which can be implemented, e.g., as a smart bubble library associated with the device.

The chat contact smart bubble process begins by selecting an existing chat contact or adding a new chat contact in the contacts list accessible by the user at 334. In some embodiments, the chat contact list can be contained in local storage on the user's chat client device. In an alternate embodiment, the chat contact list can be retrieved from a remote server.

Selecting the chat contact can be performed by interaction with a list displayed of previously known chat contacts. In some embodiments, addition of a new chat contact can be accomplished by direct authentication and communication with the device or contact to be added. This communication for chat contact connection can utilize, for example, the Bluetooth wireless protocol for discovery, authentication and connection. For addition of a remote device or contact, a remote chat contact service can be queried for chat contact discovery, authentication and connection.

At 338, a determination is made by the user's chat client whether the contact includes a smart bubble library. The chat client performs this operation by examining metadata pertaining to and/or describing the chat contact. If no form library or smart bubble is contained in the chat contact, then the contact is not configured to include the interface described herein, and the process ends at 320C.

If the contact includes the smart bubble library, then at 338 the process proceeds to load the library, e.g., into chat attachment(s) for the chat. In some embodiments, the chat attachments are loaded into a data structure suited for rendering the smart bubbles available into the chat display.

The chat client can display the smart bubble as a set of options that can be selected by the user, where the user chooses one of the smart bubbles from the library via the attachments 340. The process then continues to selection of a smart bubble FIG. 3A 316.

Figure 4:
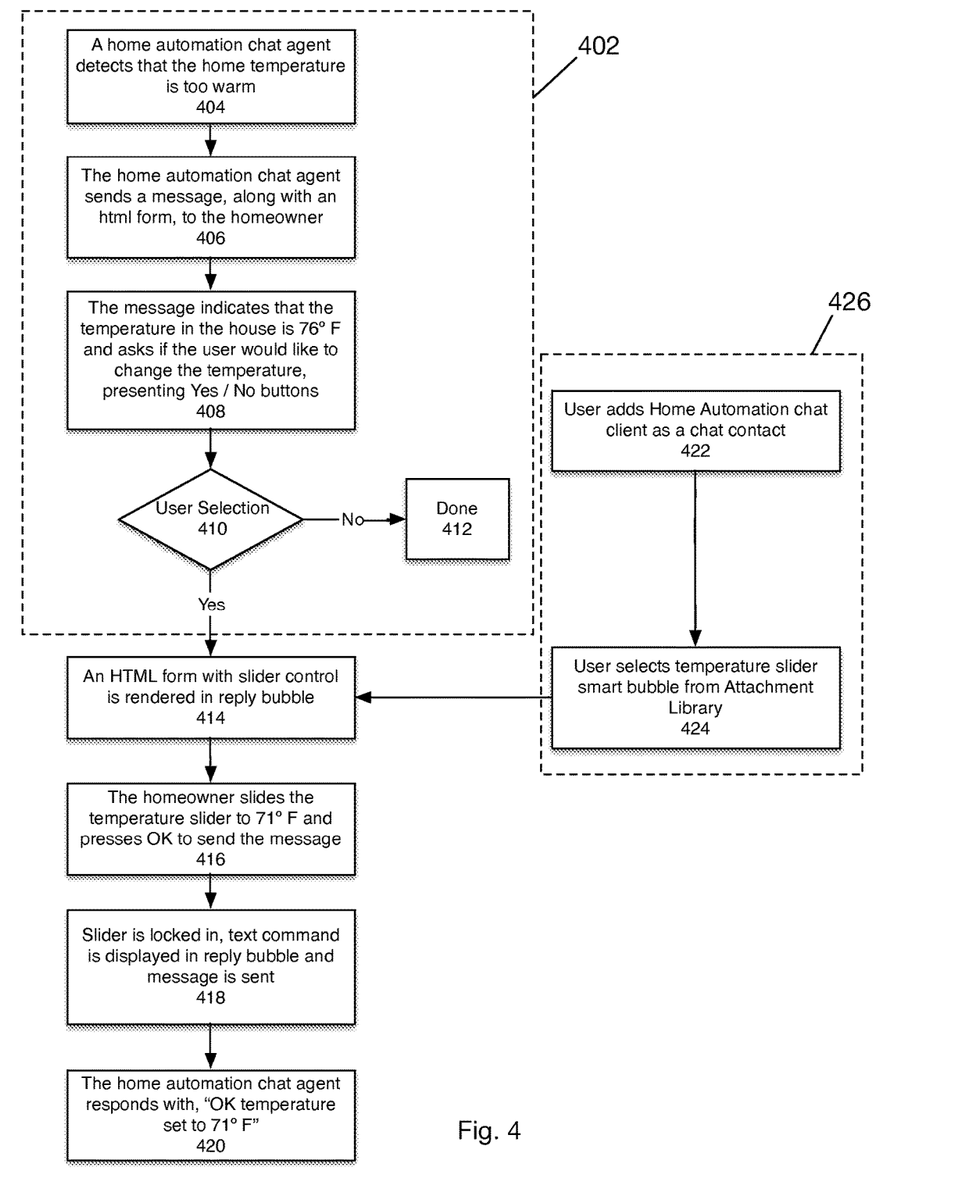
FIG. 4 provides an illustrative example flowchart of an embodiment of the invention.
Figure 5A:
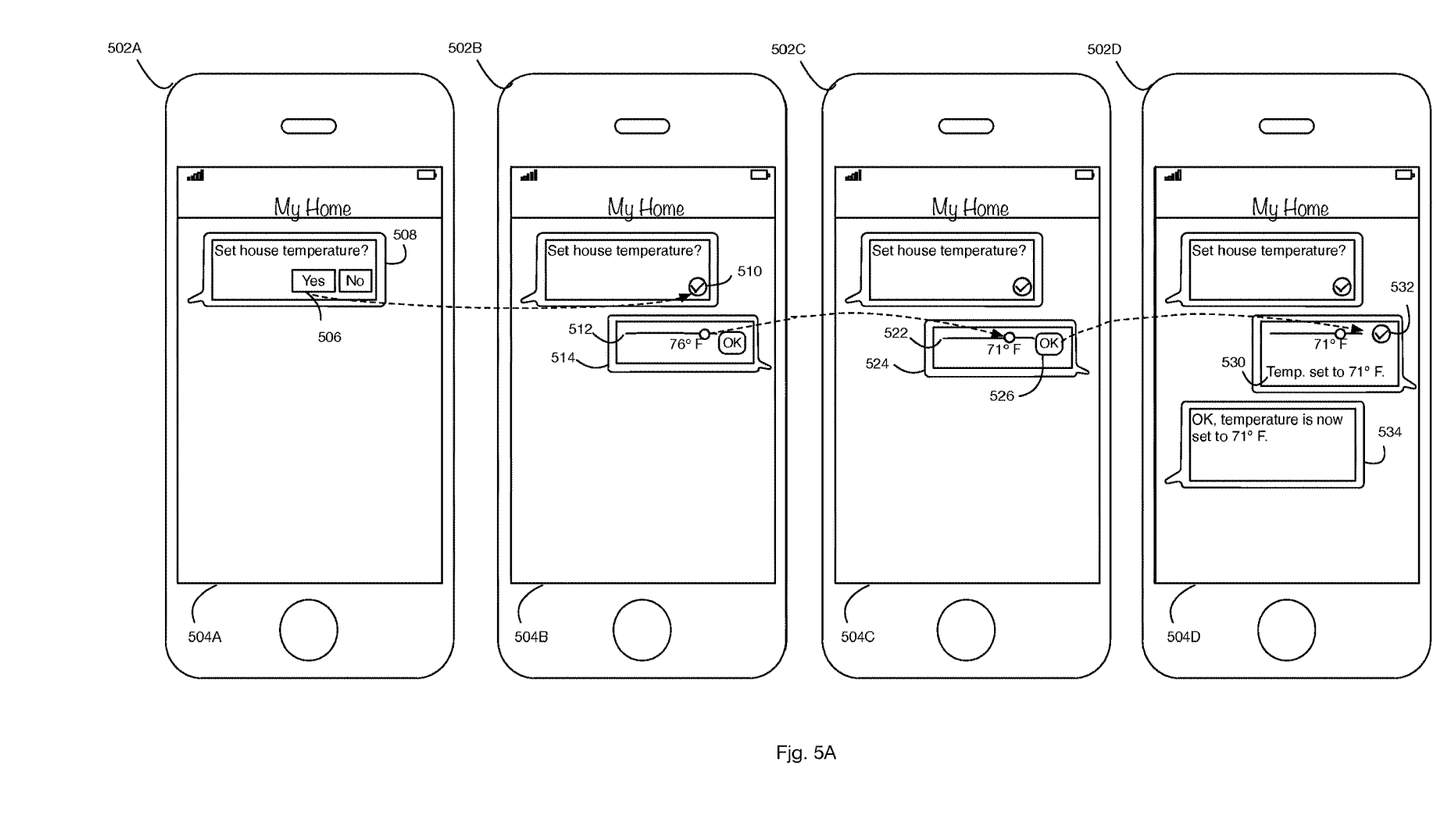
FIGS. 5A-B provide an illustrative example interface for an embodiment of the invention.
Figure 5B:
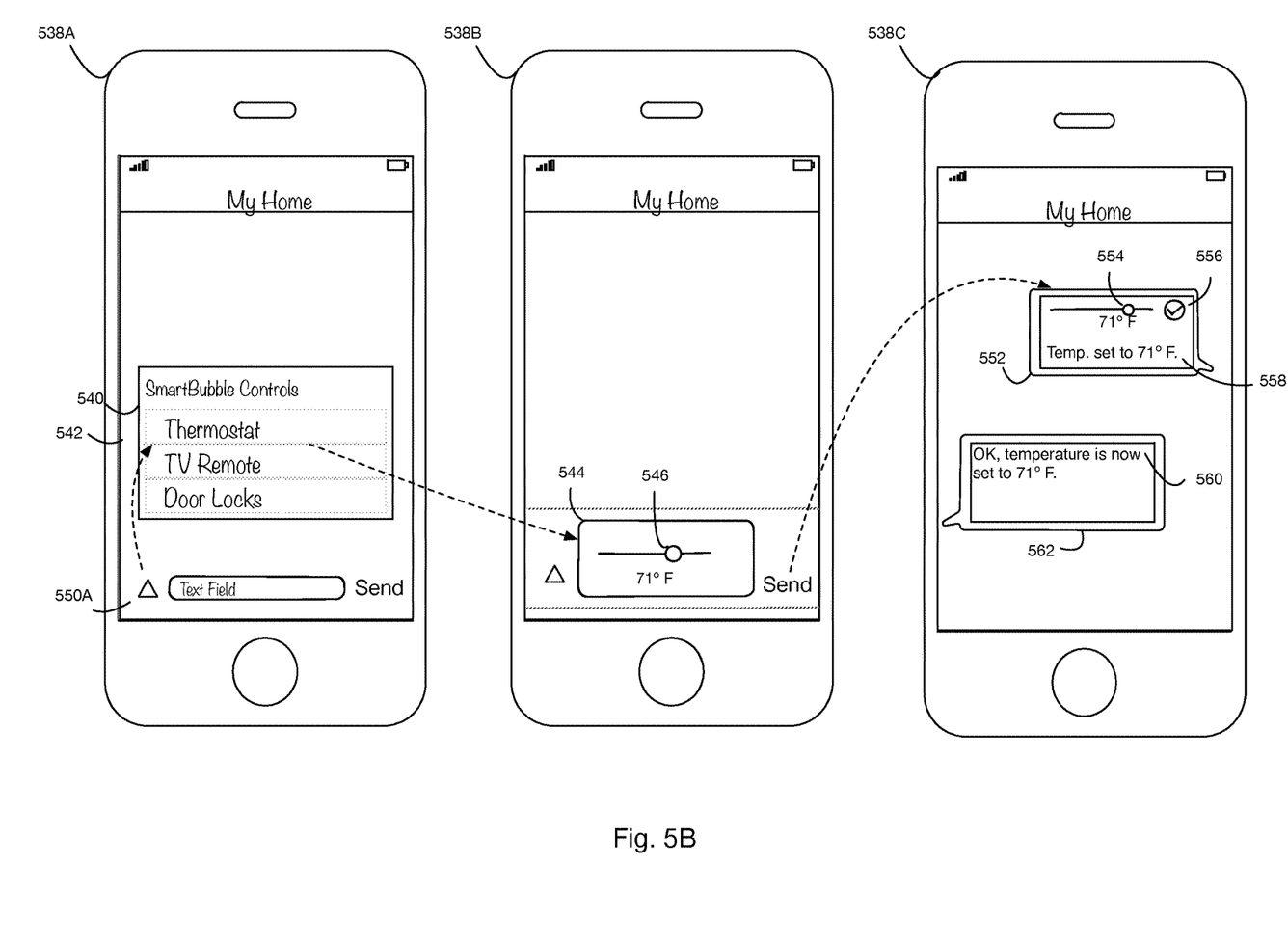

FIGS. 4 and 5A-5B provide an illustrative example of an embodiment of the invention pertaining to the scenario where a home automation chat agent (e.g., an agent controlling a thermostat) has detected that the home temperature is too warm. In the following detailed description, the flowchart of FIG. 4 describes the process steps and the diagrams of FIGS. 5A-5B illustrate the interface actions of an example scenario for home automation control using smart bubbles.

Two approaches are shown in FIGS. 4 and 5A-5B. One approach is illustrated in FIG. 5A (starting along path 402 in FIG. 4) in which a message is received from a chat agent associated with the user's home automation system thermostat. A second approach illustrating a chat contact selection and interface control using smart bubbles is illustrated in FIG. 5B (starting along path 426 in FIG. 4).

In path 402, the home control system thermostat has detected a temperature above a set value at 404. After the set temperature has been exceeded, the user's thermostat communicates to a home automation chat agent. The home automation chat agent thereafter sends a message, along with a smart bubble (e.g., a HTML form or JavaScript control) to the user at 406. At 408, the message from the chat agent is displayed (e.g., which indicates that the temperature in the home is 76 degrees), and where the message asks if the user would like to change the temperature.

FIG. 5A illustrates an example of this scenario where an interface is presented for interaction with a smart agent by use of a smart bubble. In this diagram, a digital device 502A presents a chat interface 504A for user interaction. The message is displayed to the user from the home automation system agent in message 508 within the chat interface. The message from the chat agent may, for example, indicate that the temperature in the home is 76 degrees, and asks if the user would like to change the temperature. A Yes/No button interface 506 is presented to the user in the chat bubble.

At 410 of FIG. 4, a selection choice is presented in the message for user interaction. If the user chooses "NO", then the process ends at 412. However, if the user chooses "YES", then a smart bubble (e.g., a HTML form or JavaScript control) with a slider control interface is rendered in the chat interface as a reply bubble at 414.

This is illustrated in updated interface 504B of device 502B of FIG. 5A. Here, the user has chosen "YES" on interface element 506, with an indication of acceptance is shown in interface element 510. Therefore, the process continues to the display of a smart bubble for interaction. A smart bubble 514 (e.g., a HTML form or JavaScript control) with a slider control interface 512 is rendered in the chat interface as a reply bubble.

At this point, the user can manipulate the slider interface to configure the temperature of the home (at 416 of FIG. 4). For example, as illustrated in modified interface 504C in 502C, the user may wish to manipulate the slider interface from 76 degrees to 71 degrees. When the user has finished with his manipulation of the smart bubble 524 within the chat interface and has set the slider to 71 degrees at 522, the user can select the "OK" button 526 to send the message to the chat agent.

At 418 of FIG. 4, after confirming the temperature setting, the slider is locked in, the text command is displayed in the reply bubble, and the message is then sent to the chat agent. For example, as illustrated in interface 504D of 502D, after confirming the temperature setting, the slider is locked in as shown in interface element 532, the text command is displayed in the reply bubble 530, and the message is thereafter sent to the chat agent.

At 420 of FIG. 4, upon receipt of the message, the home automation agent will then act upon the message to adjust the thermostat to change the temperature as requested. For example, as illustrated in 502D, the home automation chat agent may respond with an acknowledgement message 534 within the chat interface, e.g., indicating that the temperature has been set as requested.

With the chat contact approach starting along path 426 of FIG. 4, the user may add the home automation chat client/agent as a chat contact at 422 within a chat interface. At 424, the user can then select a smart bubble of interest, e.g., a temperature slider smart bubble. The process then goes to 414 to proceed as discussed above.

FIG. 5B illustrates this process. As illustrated in 538A, the user may add the home automation chat client/agent as a chat contact within a chat interface 542. Within the chat interface 542, a control 550A to show available chat contacts can be selected. A list of possible smart bubbles from the smart bubble library can then be displayed to the user for selection within interface portion 540.

For example, the user may choose a smart bubble corresponding to the interface to adjust the thermostat. At this point, as illustrated in 538B, an interface element 544 having the slider interface 546 for the temperature adjustment is then displayed in a chat bubble. When the user selects the send action, the client proceeds to display a smart bubble for the temperature change interface.

As illustrated in 538C, the process proceeds with the rendering of a smart bubble 552 for temperature control, selection of a new temperature using a slider control 554, acceptance of the change with interface element 556, and display of a status message 558. The message is then sent to the chat agent for the home automation system, which responds with a chat bubble 562 having a chat message 560 indicating a successful change in temperature.

Figure 6:
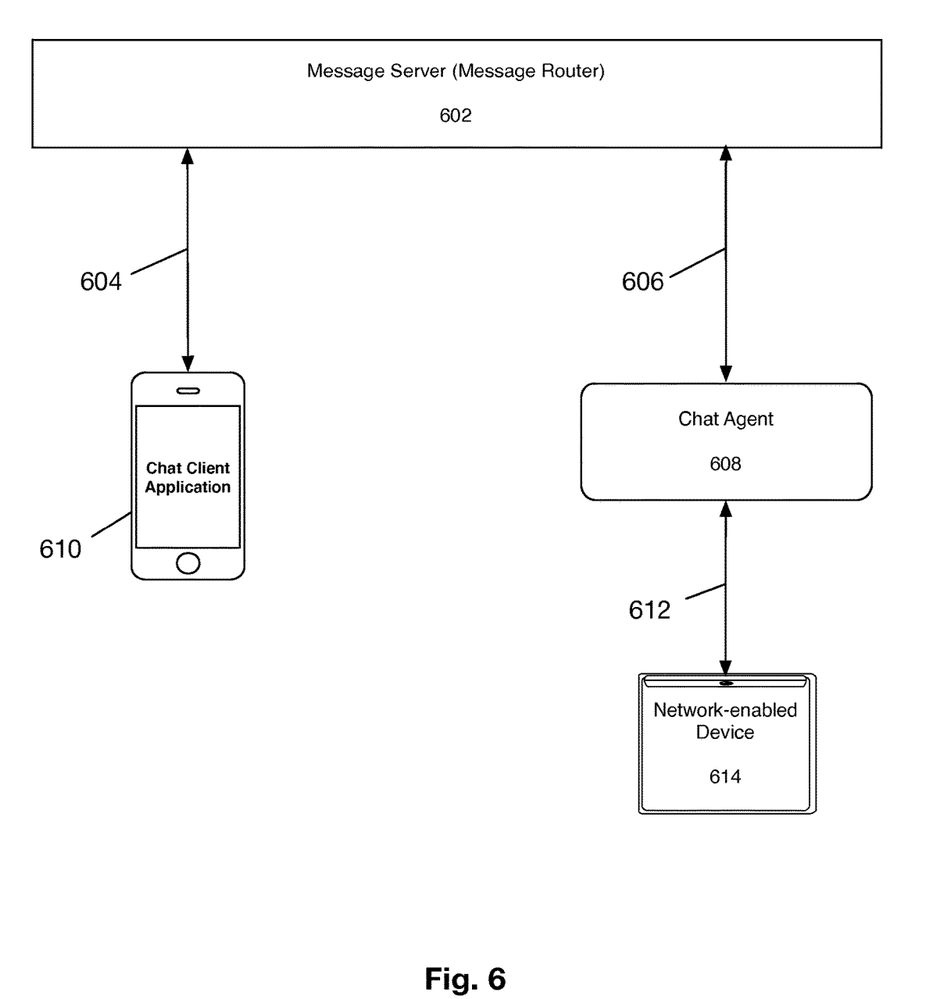
FIG. 6 illustrates an example architecture of a system environment that can be provided to implement embodiments of the invention.

FIG. 6 illustrates an example architecture of a system environment that can be provided to implement embodiments of the invention. The architecture includes one or more users at one or more user stations that operate the system 610. The user station comprises any type of computing station that may be used to operate or interface with the applications in the system.

Examples of such user stations include, for example, mobile devices (such as iOS or Android handhelds/telephones), tablets, workstations, personal computers, or remote computing terminals. The user station comprises a display device, such as a display monitor, for displaying a user interface to users at the user station. The user station also comprises one or more input devices for the user to provide operational control over the activities of the system, such as a touchscreen or keyboard, to manipulate a graphical user interface to generate user inputs. The user station communicates with a message router over a network connection 604.

A messaging platform 602 is provided to communicate messages between the participants in the system. The messaging platform 602 includes a messaging system operating system to generally manage and implement the operational functionality of the platform. This permits messages to be exchanged over a network connection 606 between the user stations 610 and the remote chat agents 608. The message server is described in further detail in FIG. 8.

Each chat agent 608 comprises a chat adaptor and a local device agent. The local device agent comprises a set of software and/or hardware components that can be used to control the remote device. The local device agent may be implemented, for example, to be embodied as an API (applications programming interface) provided by the manufacturer of the device to be controlled.

The chat agent or chat adaptor functions as a software layer to interface 612 between the messaging format of the message and the specific API for the device 614 to be controlled. This permits control of devices provided by manufacturers that publish API specifications for their products. In addition, a control format not specific to any particular manufacturer (e.g., as an open and/or widely adopted standard) can be provided to permit usage of the invention.

Figure 7:
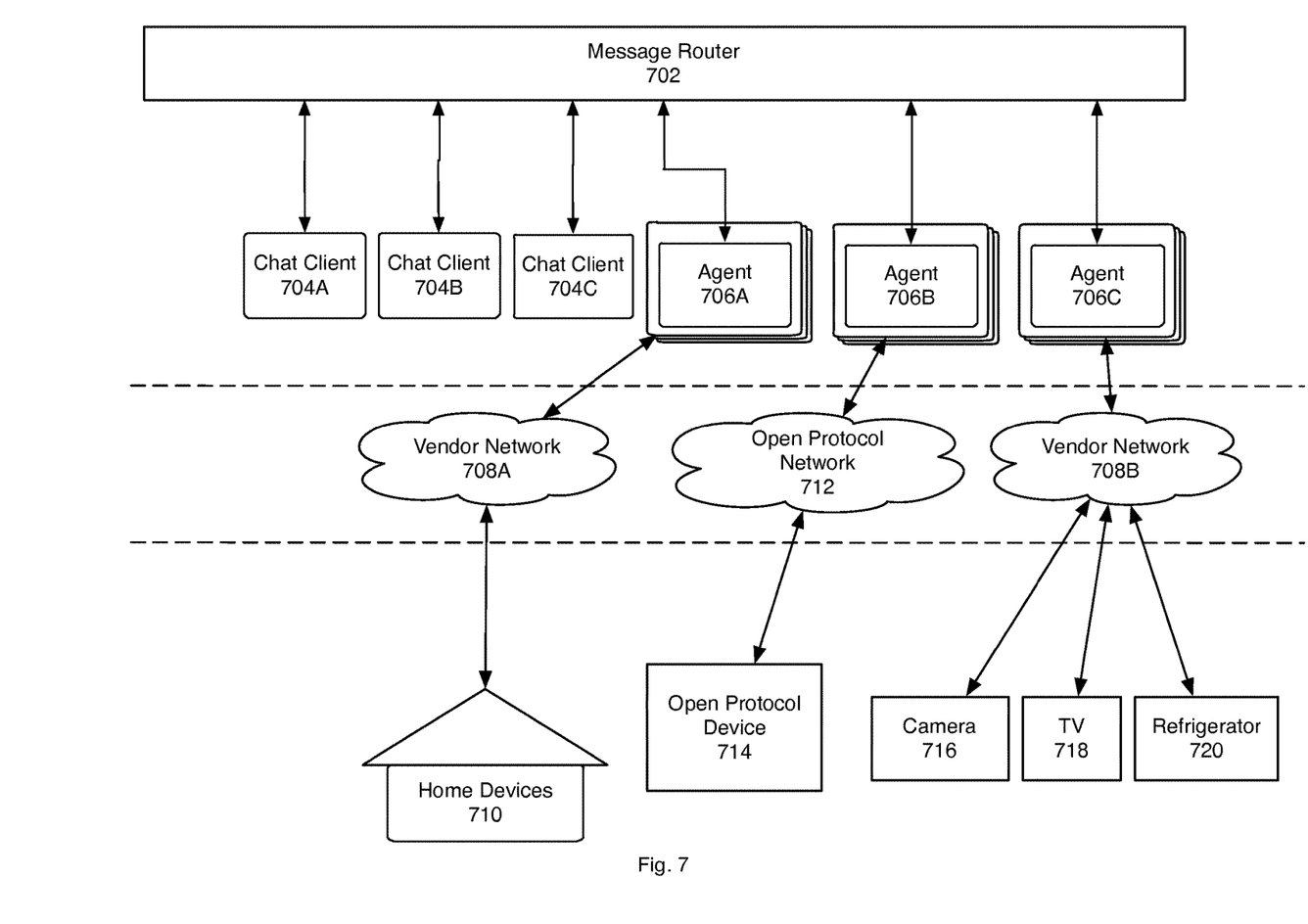
FIG. 7 shows an example system integration diagram for smart bubble agents connected to multiple systems.

FIG. 7 is a diagram which describes chat clients and chat agents in the larger system of multiple users, devices and networks. The system includes multiple users with multiple types of chat clients 704A-704C. For example, a user may utilize a mobile phone, a laptop computer and a tablet computer as a chat client. Multiple users can be utilizing chat clients 704A-704C to communicate with the message routing service 702 for delivery and receipt of messages from the smart bubble agents 706A-706C.

Smart bubble agents 706A-706C process, send, and/or receive messages over a message routing service 702 from chat clients 704A-704C. These agents utilize APIs provided by vendor networks 708A-708B and/or open protocol or other device networks 712 to control various devices. Some examples of devices to be controlled by chat agents include cameras 716, televisions (TVs) 718, home devices 710, refrigerators 720, and any other devices 714 (e.g., open protocol devices).

Figure 8:
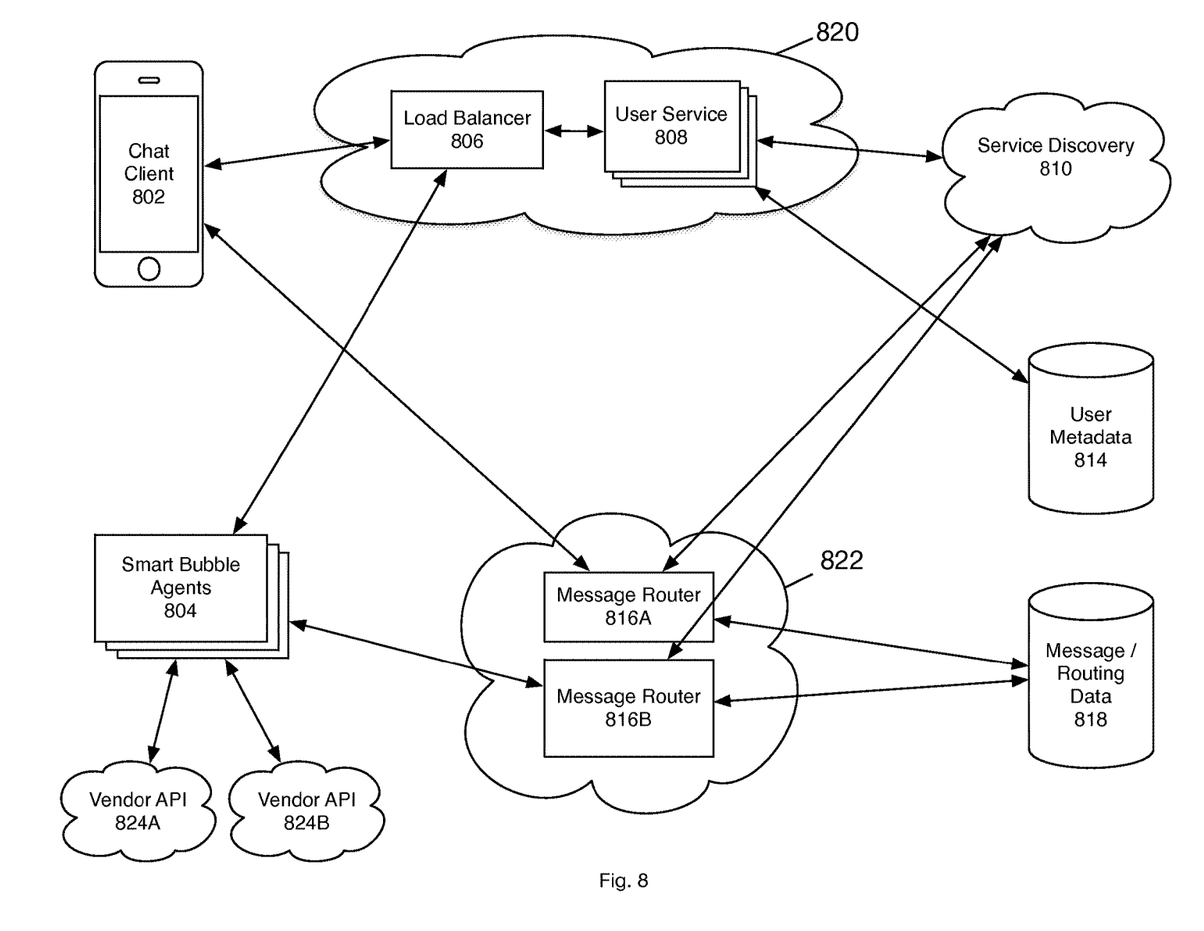
FIG. 8 illustrates an example approach that can be used to implement a messaging platform.

FIG. 8 illustrates an example approach that can be used to implement a messaging platform. The user device 802 can communicate with one or more application services 820, e.g., for user application services/servers 808 or other information and data processing services. A user device can include mobile devices (e.g., iOS or Android handhelds/telephones), tablets, workstations, personal computers, or remote computing terminals.

A user application service/server 808 provides user authentication, registration, login, security, and user data storage/retrieval. In some embodiments, the user application server can be implemented using a web application framework (e.g., Ruby on Rails). A web application framework is utilized to provide libraries for database access, session management, security authentication, and HyperText Markup Language (HTML) template frameworks.

Chat clients existing on user devices connect to one or more user services, which perform authentication and also function to assign connection nodes through a service discovery process 810. The service discovery process 810 can assign a chat or message router node 816A-816B for establishment of a socket connection for message passing between chat clients 802 and smart bubble agents 804. The method of assignment is by designating an Internet Protocol address (IP address) and port for the service to be assigned and communicating this assignment back to the service requestor. The service discovery process 810 can also provide configuration information within the system, through receipt of configuration data sent in key-value pairs.

In this process of socket connection establishment between chat clients 802 and chat or smart bubble agents 804, a request is made to the service discovery process through the user service to assign a message router node 816A-816B in the message routing service 822. Once a socket connection has been established to a node on the message routing service 822, a chat client 802 or chat agent 804 can pass messages over the service. The socket connection can utilize Transport Layer Security (TLS)/Secure Sockets Layer (SSL) for secure communication over Transmission Control Protocol (TCP).

Once a socket connection with the message router service 822 and an individual message router node 816A has been established, messages which can include smart bubbles, can be exchanged between user client devices 802 and smart bubble agents 804. Message passing can also occur between two user client devices connected to the message router service 822. Once a message is sent, if the receiving party is not connected to the message router service 822, the message is stored in the message database 818 until message delivery can be attempted and accomplished.

Communication for commands and data exchange can also occur within the system between user services 808, application servers 820, message router nodes 816A-816B, service discovery nodes 810, user databases 814, message databases 818, and/or other application services 820. It is noted that the external smart bubble chat agents 804 will also communicate within this architecture.

In some embodiments, once a smart bubble agent 804 receives a message containing requested actions from a smart bubble, the agent 804 can utilize a set of Application Programming Interfaces (APIs) provided by device or service vendors over Hypertext Transfer Protocol (HTTP) to perform the required actions. The API calls from a smart bubble agent 804 to the vendor APIs 824A-824B can be made over the open internet, over a Virtual Private Network (VPN) or to a local service. Smart bubble agents 804 and message router nodes 816A-816B can be implemented using a programming language that supports a high number of concurrent requests and connections. For example, a smart bubble agent can be implemented in the Erlang language, as Erlang supports distributed, soft real-time and highly available applications.

If multiple application servers 808 are provided, a load balancer 806 can be used to balance the workload between the application servers. Load balancing is utilized to optimize resource use, maximize throughput, minimize response time, and avoid overload of any single resource. Load balancing for application servers can be implemented using a software system, for example the HAProxy open source TCP/HTTP load balancing software. A hardware system can also be utilized for load balancing. A hardware load-balancing device (HLD), is a physical unit which routes connections to individual servers in a network, based on factors such as server processor utilization, number of connections, or the overall server performance.

Data objects are stored in one or more databases comprising user metadata 814, message metadata 818 and/or other application specific data. Information or data objects contained in the user metadata database 814 may include user identifiers, user names, user authentication credentials (e.g., salted hashed passwords), user location information, user device information, and user OAuth keys. Message data objects can include message identifiers, message timestamps, message address data, message Quality of service (QoS) data, message types, and message payloads.

User databases 814 and message databases 818 can be implemented using common database software. Non-relational databases are particularly appropriate for utilization as database software in the message service architecture, as they provide simplicity of design, simpler scaling to clusters of machines, and finer control of availability.

Data structures utilized in the message service user database 814 and message data database 818 can be of the column or key-value format. For example, the message database 818 can be implemented using the Riak database software. Riak is a distributed NoSQL key-value data store that offers high availability, scalability and fault tolerance.

Figure 9:
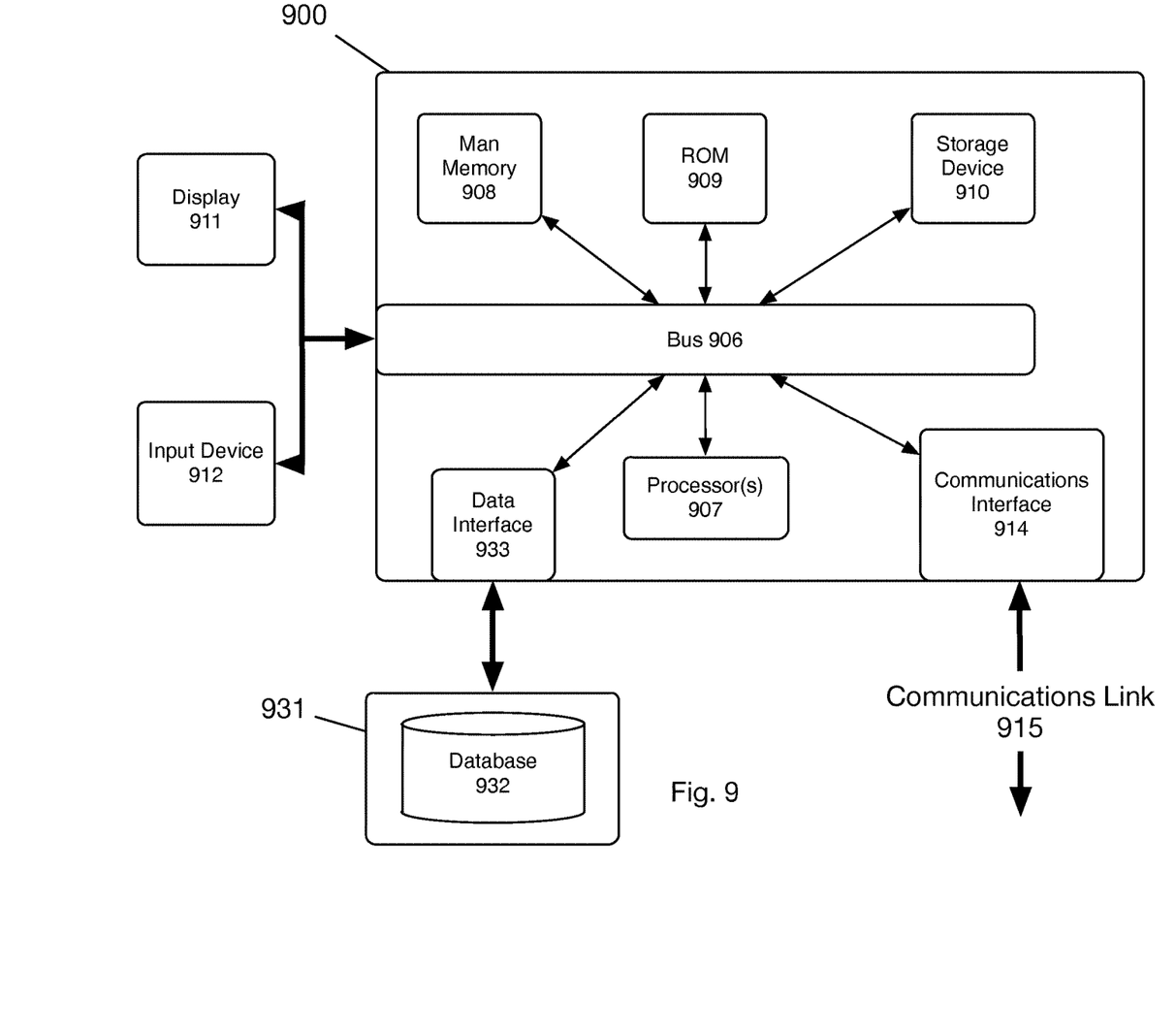
FIG. 9 is a block diagram of an illustrative computing system.

FIG. 9 is a block diagram of an illustrative computing system 900 suitable for implementing an embodiment of the present invention. Computer system 900 includes a bus 906 or other communication mechanism for communicating information, which interconnects subsystems and devices, such as processor 907, system memory 908 (e.g., RAM), static storage device 909 (e.g., ROM), disk drive 910 (e.g., magnetic or optical), communication interface 918 (e.g., modem or Ethernet card), display 911 (e.g., CRT or LCD), input device 912 (e.g., keyboard), and cursor control.

According to one embodiment of the invention, computer system 900 performs specific operations by processor 907 executing one or more sequences of one or more instructions contained in system memory 908. Such instructions may be read into system memory 908 from another computer readable/usable medium, such as static storage device 909 or disk drive 910. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 907 for execution. Such a medium may take many forms, including but not limited to, non-volatile media and volatile media. Non-volatile media includes, for example, optical or magnetic disks, such as disk drive 910. Volatile media includes dynamic memory, such as system memory 908.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, cloud-based storage, or any other medium from which a computer can read.

In an embodiment of the invention, execution of the sequences of instructions to practice the invention is performed by a single computer system 900. According to other embodiments of the invention, two or more computer systems 900 coupled by communication link 915 (e.g., LAN, PTSN, or wireless network) may perform the sequence of instructions required to practice the invention in coordination with one another.

A computer system 900 may transmit and receive messages, data, and instructions, including program, i.e., application code, through communication link 915 and communication interface 914. Received program code may be executed by processor 907 as it is received, and/or stored in disk drive 910, or other non-volatile storage for later execution. Data may be accessed from a database 932 that is maintained in a storage device 931, which is accessed using a data interface 933.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method implemented with a processor, comprising:
generating an interface on a client device to control a remote device, wherein the interface comprises a chat bubble;
enabling a user using the interface having the chat bubble to interact with a chat agent comprising a software program or embedded device associated with the remote device which can communicate with the client device; and
controlling operations of the remote device based at least in part upon actions taken in the interface that are conveyed to the chat agent which are used by the user to operate the remote device,
wherein the interface is embedded directly into a chat message.

2. The method of claim 1, wherein the chat agent comprises a contact for the chat bubble and control messages are sent to/from the chat agent through the interface.

3. The method of claim 2, in which the control messages are converted into a format understandable by the remote device.

4. The method of claim 3, in which an API call is made to implement the control messages.

5. The method of claim 1, wherein the interface comprises a graphical interface for manipulating the remote device.

6. The method of claim 5, wherein the graphical interface comprises a graphical slider bar to control a remote thermostat.

7. The method of claim 1, wherein the interface comprises a smart bubble.

8. The method of claim 1, wherein a chat contact is created for the chat agent, and a smart bubble/smart bubble library is embedded in the chat contact.

9. The method of claim 1, wherein the interface in the chat bubble is manipulated a plurality of times by a user.

10. A computer readable medium having stored thereon a sequence of instructions which, when executed by a processor causes the processor to execute a method, the method comprising:
generating an interface on a client device to control a remote device, wherein the interface comprises a chat bubble;
enabling a user using the interface having the chat bubble to interact with a chat agent comprising a software program or embedded device associated with the remote device which can communicate with the client device; and
controlling operations of the remote device based at least in part upon actions taken in the interface that are conveyed to the chat agent which are used by the user to operate the remote device,
wherein the interface is embedded directly into a chat message.

11. The computer readable medium of claim 10, wherein the agent comprises a contact for the chat bubble and control messages are sent to/from the chat agent through the interface.

12. The computer readable medium of claim 11, in which the control messages are converted into a format understandable by the remote device.

13. The computer readable medium of claim 12, in which an API call is made to implement the control messages.

14. The method of claim 10, wherein the interface comprises a graphical interface for manipulating the remote device.

15. The computer readable medium of claim 14, wherein the graphical interface comprises a graphical slider bar to control a remote thermostat.

16. The computer readable medium of claim 10, wherein the interface comprises a smart bubble.

17. The computer readable medium of claim 10, wherein a chat contact is created for the chat agent, and a smart bubble/smart bubble library is embedded in the chat contact.

18. The computer readable medium of claim 10, wherein the interface in the chat bubble is manipulated a plurality of times by a user.

19. A computing system, comprising:
a processor;
a memory comprising computer program code for generating an interface on a client device to control a remote device, wherein the interface comprises a chat bubble;
enabling a user using the interface having the chat bubble to interact with a chat agent comprising a software program or embedded device associated with the remote device which can communicate with the client device; and controlling operations of the remote device based at least in part upon actions taken in the interface that are conveyed to the chat agent which are used by the user to operate the remote device,
wherein the interface is embedded directly into a chat message.

20. The system of claim 19, wherein the agent comprises a contact for the chat bubble and control messages are sent to/from the chat agent through the interface.

21. The system of claim 20, in which the control messages are converted into a format understandable by the remote device.

22. The system of claim 21, in which an API call is made to implement the control messages.

23. The system of claim 19, wherein the interface comprises a graphical interface for manipulating the remote device.

24. The system of claim 23, wherein the graphical interface comprises a graphical slider bar to control a remote thermostat.

25. The system of claim 19, wherein the interface comprises a smart bubble.

26. The system of claim 19, wherein a chat contact is created for the chat agent, and a smart bubble/smart bubble library is embedded in the chat contact.

27. The system of claim 19, wherein the interface in the chat bubble is manipulated a plurality of times by a user.

* * * * *